(12) United States Patent
Kudo et al.

(10) Patent No.: US 11,144,723 B2
(45) Date of Patent: Oct. 12, 2021

(54) METHOD, DEVICE, AND PROGRAM FOR TEXT CLASSIFICATION

(71) Applicant: FUJITSU LIMITED, Kawasaki (JP)

(72) Inventors: Jumma Kudo, Arakawa (JP); Daiki Hanawa, Kawasaki (JP); Toshihide Miyagi, Kawasaki (JP); Kota Yamakoshi, Ota (JP); Keisuke Hirota, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 200 days.

(21) Appl. No.: 16/429,123

(22) Filed: Jun. 3, 2019

(65) Prior Publication Data

US 2020/0004817 A1    Jan. 2, 2020

(30) Foreign Application Priority Data

Jun. 29, 2018    (JP) .............................. JP2018-123996

(51) Int. Cl.
*G06F 40/268* (2020.01)

(52) U.S. Cl.
CPC .................................. *G06F 40/268* (2020.01)

(58) Field of Classification Search
USPC .............. 382/155–231, 290–308; 704/1–277
See application file for complete search history.

(56) References Cited

U.S. PATENT DOCUMENTS

| | | | | |
|---|---|---|---|---|
| 6,553,419 B1 * | 4/2003 | Ram | ................... | G06F 11/3476 709/224 |
| 2002/0065845 A1 | 5/2002 | Naito et al. | | |
| 2002/0184029 A1 * | 12/2002 | Brittan | ................... | G10L 13/08 704/260 |
| 2005/0203900 A1 * | 9/2005 | Nakamura | ........... | G06F 16/334 |
| 2010/0049499 A1 * | 2/2010 | Hayashi | ............... | G06F 40/268 704/9 |
| 2012/0072937 A1 | 3/2012 | Ikeda et al. | | |
| 2016/0034525 A1 * | 2/2016 | Neels | .................... | G06F 16/285 707/737 |

FOREIGN PATENT DOCUMENTS

| | | |
|---|---|---|
| JP | 2002-041573 | 2/2002 |
| JP | 2012-003704 | 1/2012 |
| JP | 2012-070036 | 4/2012 |

* cited by examiner

*Primary Examiner* — Marcellus J Augustin
(74) *Attorney, Agent, or Firm* — Fujitsu Patent Center

(57) ABSTRACT

A text classification method is performed in a computer. The method includes: receiving a plurality of texts. When detecting that a text among the received plurality of texts includes a pause part satisfying a specific condition, dividing the text at the pause part and generating a new plurality of texts. The method may also include classifying texts, among the received plurality of texts, not including the pause part satisfying the specific condition, and the generated new plurality of texts into a plurality of clusters.

18 Claims, 12 Drawing Sheets

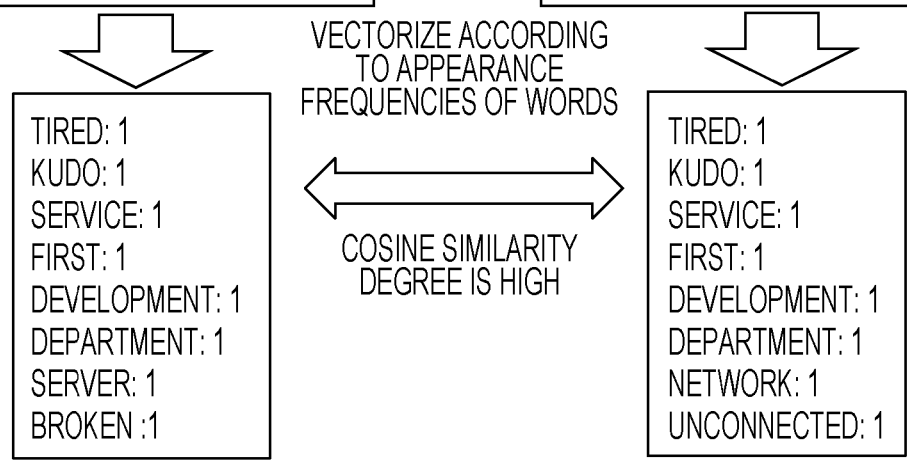

| WORD | IDF VALUE |
|---|---|
| WORD 1 | 0.1 |
| WORD 2 | 0.4 |
| ... | |

24A

| WORD | WORD VECTOR |
|---|---|
| WORD 1 | VECTOR 1 |
| WORD 2 | VECTOR 2 |
| ... | |

24B

24

METHOD, DEVICE, AND PROGRAM FOR TEXT CLASSIFICATION

CROSS-REFERENCE TO RELATED APPLICATION

This application is based upon and claims the benefit of priority of the prior Japanese Patent Application No. 2018-123996, filed on Jun. 29, 2018, the entire contents of which are incorporated herein by reference.

FIELD

The embodiment discussed herein is related to a classification method, a classification device, and a classification program of text data.

BACKGROUND

A document (text data) described in a natural language has been classified based on described content.

For example, there has been proposed an information retrieval system that stores, in a document storing unit, questions and answers associated with each other and performs cluster classification of the answers based on feature vectors of the answers in the document storing unit (Japanese Laid-open Patent Publication No. 2002-41573).

There has been proposed a FAQ candidate extraction system that receives input of talk data and talk semantics and extracts questions serving as FAQ candidates from the talk data and outputs the questions. In the system, the talk semantics includes flow information of statements. The system extracts, from the talk data, question and request statements uttered by a client, a flow indicating a question or a request being set in the question and request statements. The system extracts question and request statements including a designated keyword out of the question and request statements, performs clustering concerning the question and request statements, and outputs, as FAQ candidates, the question and request statements representing clusters (Japanese Laid-open Patent Publication No. 2012-3704).

There has been proposed a device that includes a viewpoint-list storing unit having stored therein a viewpoint list including tree-like viewpoints and attribute words and a learning-sentence-information storing unit having stored therein a large number of kinds of learning sentence information related to the attribute words. The device extracts a plurality of keywords from shared contents and derives a first vector having a keyword as an element and having an appearance frequency of the keyword as a value. For each of the keywords, concerning learning sentence information in an attribute word coinciding with the keyword, the device derives a second vector having a word included in the learning sentence information as an element and having an appearance frequency of the word as a value. Further, the device calculates a similarity degree of both the vectors, generates a similarity-degree-associated viewpoint list associated with the similarity degrees, and derives, for each of layers of the viewpoint list, a viewpoint and an attribute word having the largest dispersion of the similarity degrees (Japanese Laid-open Patent Publication No. 2012-70036).

However, for example, when a fixed form expression (such as a season greeting) is included in texts, the fixed form expression adversely affects the device. The device is unable to extract appropriate features from the documents and is unable to appropriately perform classification of the documents.

As an aspect, an object of the disclosed technique is to improve classification accuracy of texts.

SUMMARY

According to an aspect of the embodiments, a text classification method is performed in a computer. The method includes: receiving a plurality of texts; when detecting that a text among the received plurality of texts includes a pause part satisfying a specific condition, dividing the text at the pause part and generating a new plurality of texts; and classifying texts, among the received plurality of texts not including the pause part satisfying the specific condition, and the generated new plurality of texts into a plurality of clusters.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram for explaining the influence of a fixed form expression on classification of documents;

FIG. 3 is a diagram for explaining the influence of the fixed form expression on the classification of the documents;

DESCRIPTION OF EMBODIMENTS

An example of an embodiment related to a disclosed technique is explained below with reference to the drawings.

A classification device according to this embodiment classifies texts included in a text set into a plurality of clusters in order to extract a fixed form expression.

Before details of the embodiment are explained, a reason for classifying the texts in order to extract the fixed form expression is explained. For example, it is assumed that documents such as mail during incident handling concerning a system are classified and it is specified which cases the incidents represented by the documents concern.

Figure 1:
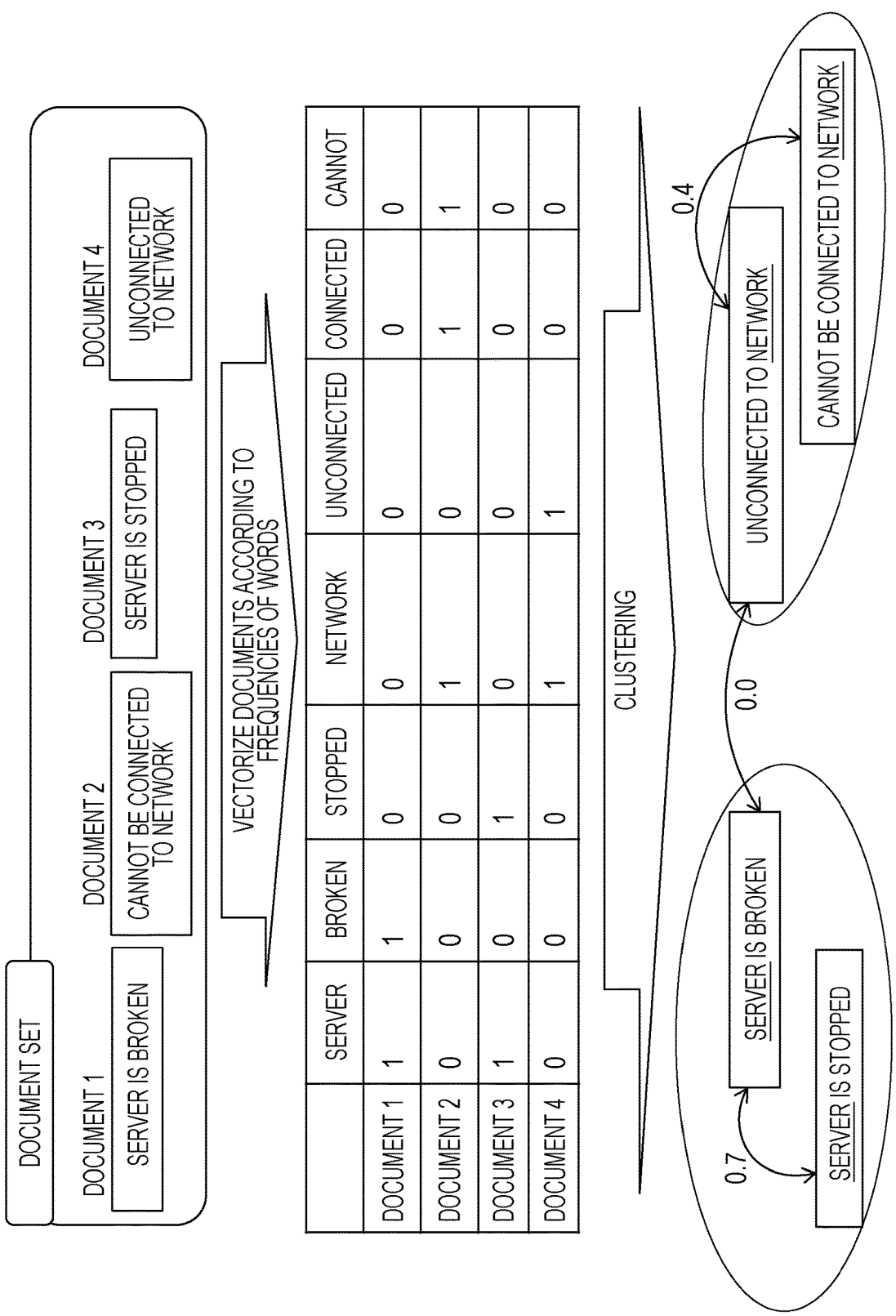
FIG. 1 is a diagram for explaining classification of documents.

For example, as illustrated in FIG. 1, a set of sentences in one incident is set as one document. Documents included in document sets concerning a plurality of incidents are vectorized at appearance frequencies of words included in the documents according to a method such as Bag of Words (BoW). The documents are classified by collecting the documents having high cosine similarity degrees ("0.7", "0.0", and "0.4" in FIG. 1) of vectors as clusters.

Feature words (words indicated by underlining in FIG. 1) included in the documents belonging to the clusters are extracted by term frequency (TF)—inverse document frequency (IDF) or the like and associated with the clusters to make it possible to grasp incidents of which cases the documents included in the clusters are. A TF value and an IDF value are defined as follows.

A TF value of a word w=the number of appearances of the word w in a document/the number of appearances of all words in the document.

An IDF value of the word w=log (a total number of documents/the number of documents including the word w).

However, in the vectorization, a fixed form expression included in the documents is also vectorized. The fixed form expression turns into noise and adversely affects cosine similarity degrees. For example, as illustrated in FIG. 2, a question 1 is an inquiry concerning a server. A question 2 is an inquiry concerning a network. Question contents of the question 1 and the question 2 are different from each other. However, both questions include a fixed form expression such as "Thank you for being tired (a typical Japanese greeting phrase), this is Kudo of Service First Development Department". Therefore, the cosine similarity degrees increase.

As illustrated in FIG. 3, when documents include a fixed form expression, the number of words appearing in the documents increases. Therefore, a TF value of a word that may be a feature word decreases.

In particular, in a field of incident handling concerning the system, fixed form expressions such as greetings and closing remarks tend to appear in sentences of inquiries by mail and the like from customers. Therefore, it is conceivable to delete the fixed form expressions from the documents in order to reduce the influence of the fixed form expressions on classification of the documents. However, the fixed form expressions include a proper noun such as "This is Kudo of Service First Development Department" and a peculiar expression of each of the customers. Therefore, it is difficult to define the fixed form expressions in advance.

Figure 4:
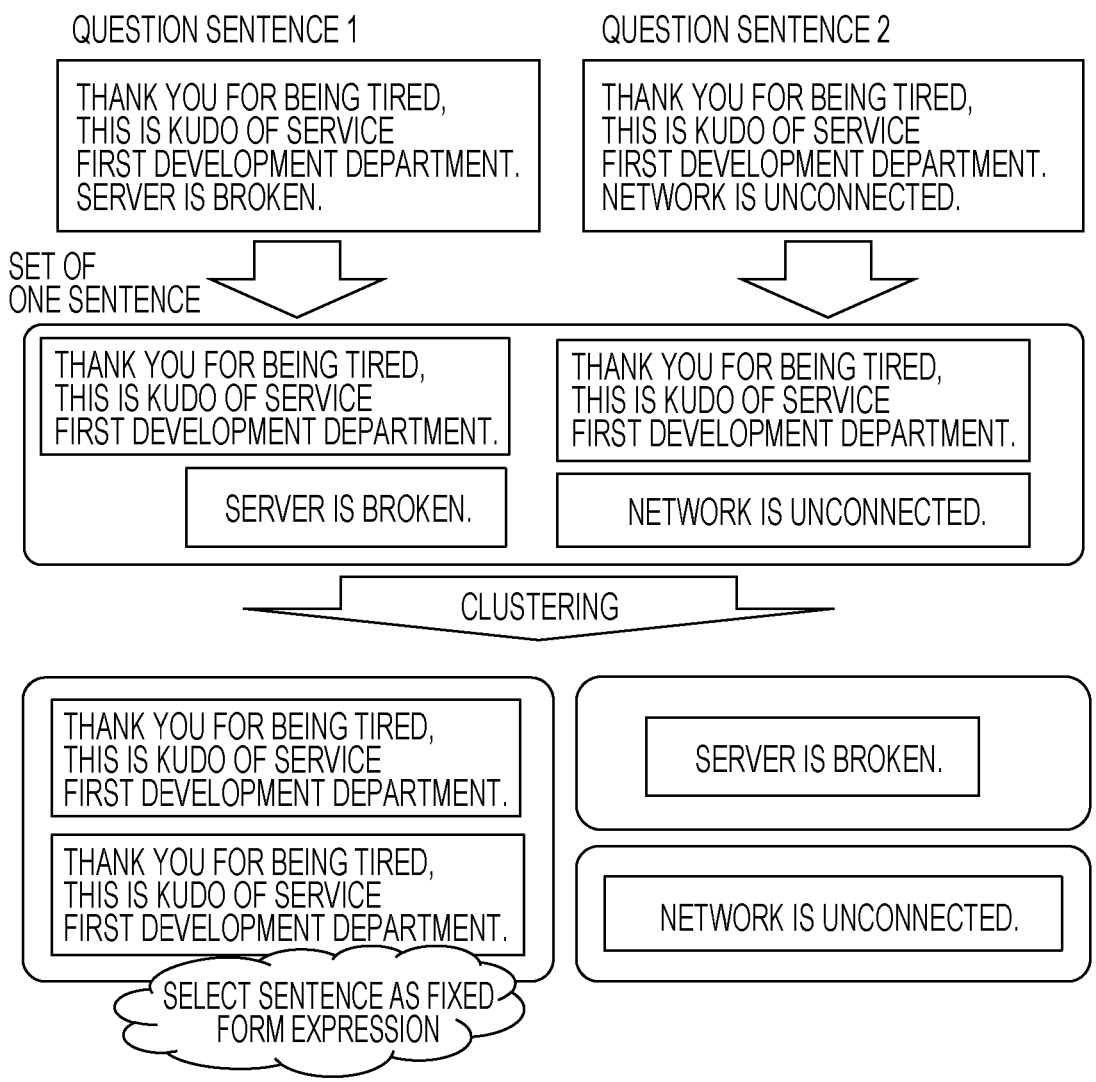
FIG. 4 is a diagram for explaining classification of texts for extracting the fixed form expression.

Therefore, for example, as illustrated in FIG. 4, a text set of one sentence is created by dividing the documents included in the document set in parts representing breaks of one sentence such as ". (a period)" and "¥n (a linefeed code). It is conceivable to vectorize and cluster sentences and confirming texts included in clusters to specify the clusters into which fixed form expressions are classified and extract the fixed form expressions. The extracted fixed form expressions are deleted from the documents.

By classifying the texts and extracting the fixed form expressions, it is also possible to extract fixed form expressions including peculiar expressions and the like. Therefore, in this embodiment, the texts are classified in order to extract the fixed form expressions.

Figure 5:
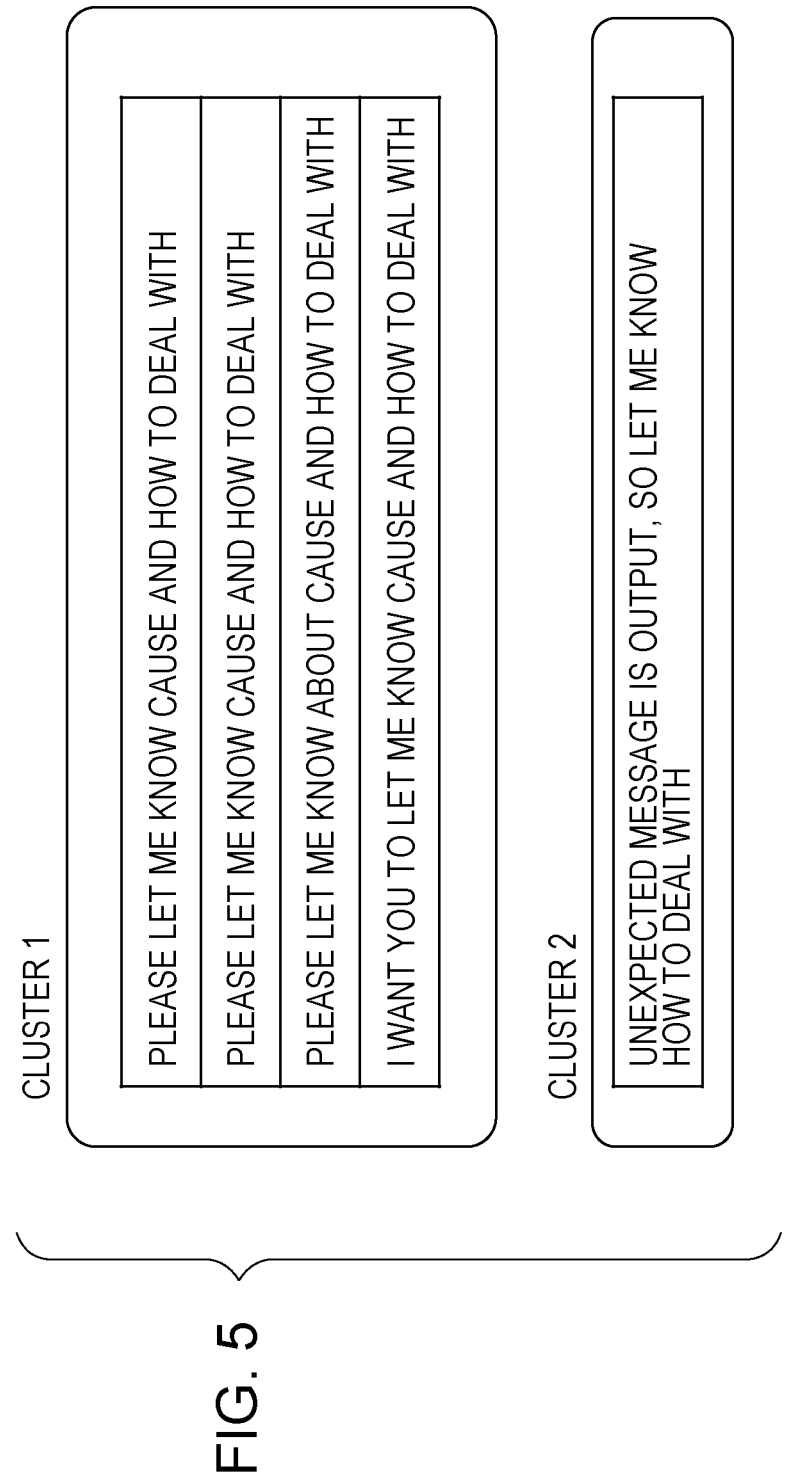
FIG. 5 is a diagram for explaining problems of the classification of the texts for extracting the fixed form expression.

However, when one sentence created from documents is a complex sentence, although the sentence includes a fixed form expression in a part of the sentence, the sentence as a whole is not regarded as the fixed form expression. The sentence is sometimes not classified into a cluster into which the fixed form expression is classified. For example, as illustrated in FIG. 5, one sentence classified into a cluster 2 includes a fixed form expression "Please let me know how to deal with" as same as the fixed form expression classified into a cluster 1, but is not classified into the cluster 1 because of the influence of a portion "an unexpected message is output, so".

Therefore, in this embodiment, texts are classified to make it possible to also extract the fixed form expression included in the complex sentence. Details of this embodiment are explained below.

Figure 6:
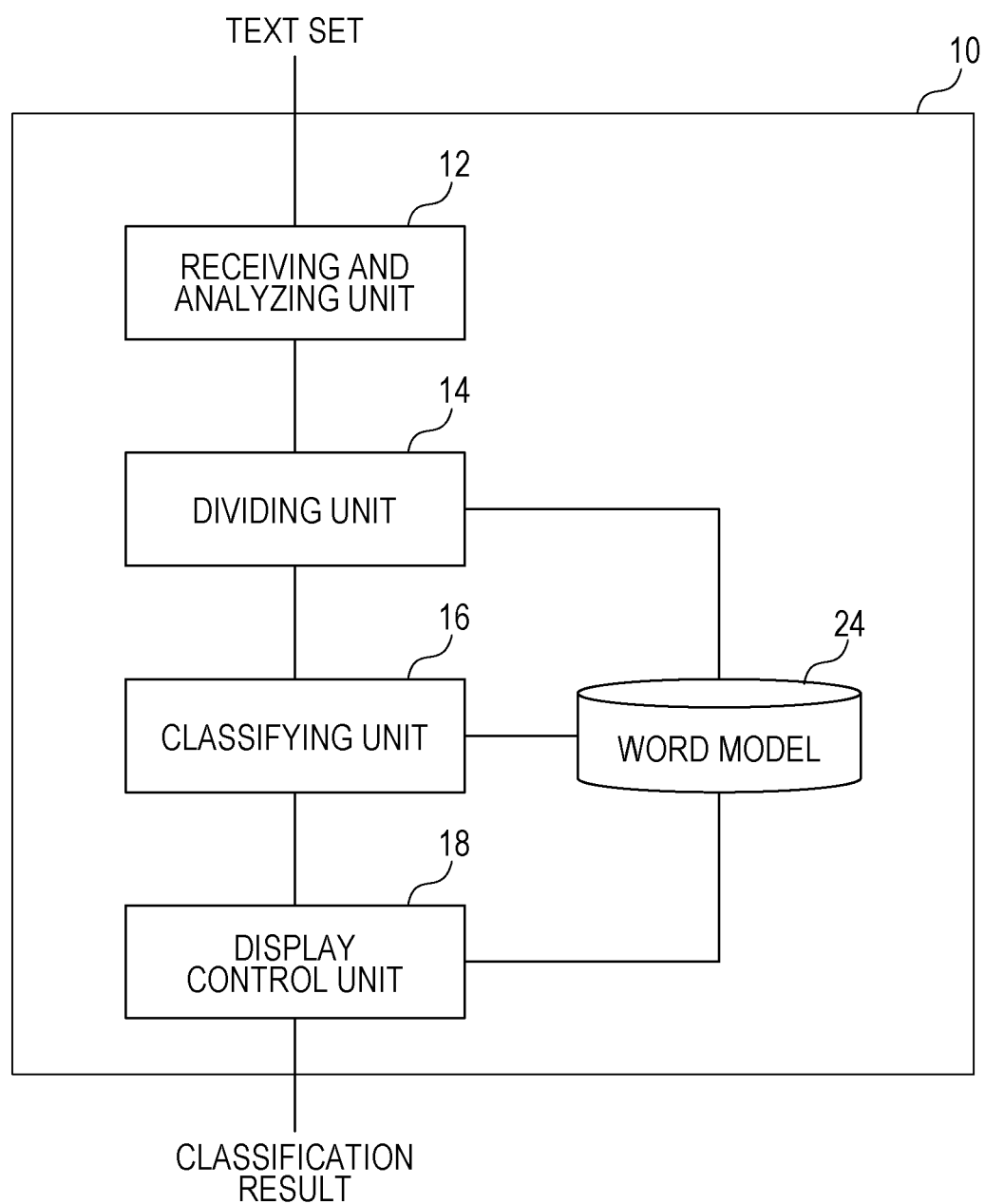
FIG. 6 is a functional block diagram of a classification device according to an embodiment.

As illustrated in FIG. 6, a classification device 10 according to this embodiment functionally includes a receiving and analyzing unit 12, a dividing unit 14, a classifying unit 16, and a display control unit 18. A word model 24 is stored in a predetermined storage region of the classification device 10. The receiving and analyzing unit 12 is an example of a receiving unit of the disclosed technique. The dividing unit 14 is an example of a generating unit of the disclosed technique.

The receiving and analyzing unit 12 receives a text set input to the classification device 10. For example, the receiving and analyzing unit 12 receives a text set in which a set of documents in one incident including documents such as mail during incident handling concerning the system is set as one document and the documents included in the document set are shaped into a text of one sentence. The shaping of the text of one sentence is performed by, for example, dividing a document in parts representing breaks of one sentence such as ". (a period)" and "¥n (a linefeed code)" included in the document.

The receiving and analyzing unit 12 performs a morphological analysis on texts included in the received text set, divides the texts into morphemes, and gives attribute information such as parts of speech and morpheme information to the morphemes. The receiving and analyzing unit 12 performs a syntactic dependency analysis on the texts using a result of the morphological analysis and analyzes a syntactic dependency relation of each of clauses.

Figure 7:
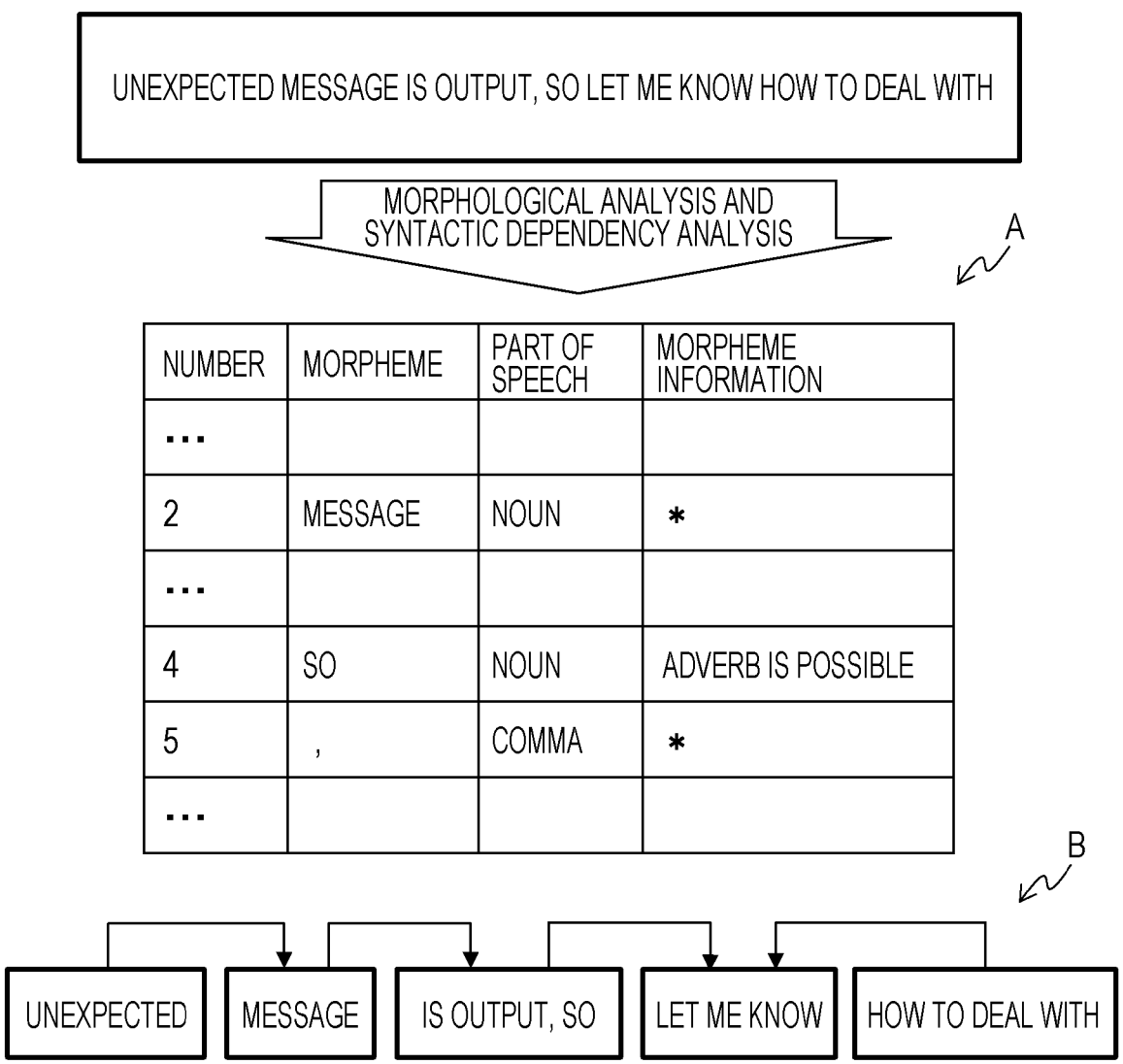
FIG. 7 is a diagram illustrating an example of an analysis result by a receiving and analyzing unit.

In FIG. 7, an example of a result of the morphological analysis and a result of the syntactic dependency analysis performed on a text "an unexpected message is output, so let me know how to deal with" by the receiving and analyzing unit 12 is illustrated. A in FIG. 7 indicates the morphological analysis result. In the example illustrated in FIG. 7, each of morphemes included in the text is numbered in order from the top of the text. Attribute information obtained as a result of the morphological analysis is associated with the morphemes. B in FIG. 7 indicates the syntactic dependency analysis result. FIG. 7 illustrates an example that the text is separated into clauses and syntactic dependency relationships among the clauses are analyzed based on the morphological analysis result. The clauses are represented by boxes and the syntactic dependency relations among the clauses are represented by arrows.

When detecting that a text among the texts included in the text set received by the receiving and analyzing unit 12 includes a pause part satisfying a specific condition, the dividing unit 14 divides the text in the pause part and generates a new plurality of texts.

Specifically, the dividing unit 14 separates, based on the analysis result of the receiving and analyzing unit 12 concerning the texts, the text into a former half and a latter half in a predetermined pause part. The predetermined pause part may be immediately after, for example, ", (a comma)" or a predetermined adverse clause. The text may be separated according to a predetermined rule using, for example, the syntactic dependency relations among the clauses.

The dividing unit 14 divides the text in the predetermined pause part when an appearance state in the text set of one of the former half portion and the latter half portion obtained by separating the text in the predetermined pause part satisfies a predetermined condition.

More specifically, the dividing unit 14 acquires IDF values of words included in the text referring to an IDF value table 24A included in the word model 24.

Figures 8, 9:
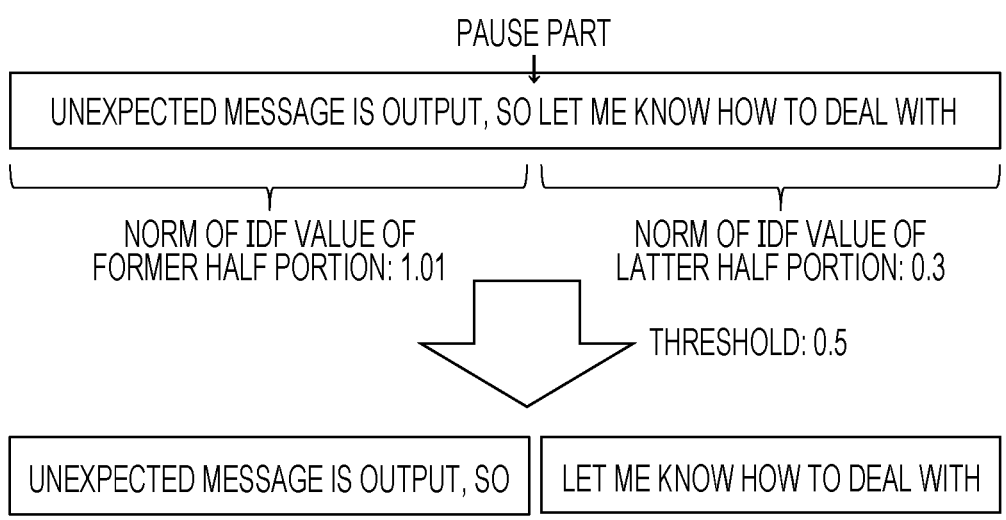
FIG. 8 is a diagram illustrating an example of a word model.
FIG. 9 is diagram for explaining division of a text.

An example of the word model 24 is illustrated in FIG. 8. The word model 24 includes the IDF value table 24A and a word vector table 24B. The IDF value table 24A is a table in which words and IDF values of the words are stored in association with each other. The IDF values may be generated from any document set in advance or may be generated from a document set on which an input text set is based. The word vector table 24B is explained below.

The dividing unit 14 calculates, using the IDF values for each of the words acquired from the IDF value table 24A, norms of vectors of the IDF values respectively concerning the former half portion and the latter half portion obtained by separating the text in the pause part. As illustrated in FIG. 9, when the norm of the IDF value of one of the former half portion and the latter half portion is equal to or smaller than a predetermined threshold, the dividing unit 14 divides the texts in the pause part. When the IDF value is small, since the portion is an expression transversely appearing in the text set, the portion is regarded as a fixed form expression. Concerning the divided text, the dividing unit 14 puts the texts after the division in a simple sentence set as simple sentences. Concerning the undivided text, the dividing unit 14 puts the original text in the simple sentence set as a simple sentence.

The classifying unit 16 classifies, into a plurality of clusters, a text not including a pause part satisfying a specific condition and a generated new plurality of texts among the texts included in the text set, that is, the respective simple sentences included in the simple sentence set.

Specifically, the classifying unit 16 vectorizes the simple sentences using the word vector table 24B of the word model 24. The word vector table 24B is a table in which words and word vectors obtained by representing the words as vectors by TF-IDF, word2vec, or the like are stored in association with each other.

The classifying unit 16 clusters the simple sentences according to a known clustering method such as k-means or simple linkage using, for example, cosine similarity degrees of the word vectors of the simple sentences.

The classifying unit 16 extracts, based on appearance states of the words included in the simple sentences respectively classified into a plurality of clusters, feature words from the respective plurality of clusters and associates the extracted feature words with the clusters. TF-IDF or the like may be used as the appearance states of the words. The feature words are an example of feature information and representative morphemes of the disclosed technique.

The display control unit 18 arranges, based on indicators concerning the appearance states of the simple sentences in the text set, the clusters in descending order of appearance frequencies indicated by the indicators concerning the simple sentences included in the respective plurality of clusters.

For example, the display control unit 18 acquires the IDF values of the words included in the simple sentences referring to the IDF value table 24A included in the word model 24 and calculates norms of IDF value vectors of the simple sentences. The display control unit 18 calculates, for each of the clusters, an average of the norms of the IDF value vectors of the respective simple sentences included in the cluster. The display control unit 18 sorts the clusters in ascending order of the averages of the norms of the IDF value vectors and displays the clusters on a display device. The cluster having a small average of the norms of the IDF value vectors represents that the simple sentence included in the cluster transversely appears in the text set. Therefore, the cluster is regarded as a cluster into which the fixed form expression is classified.

Figure 10:
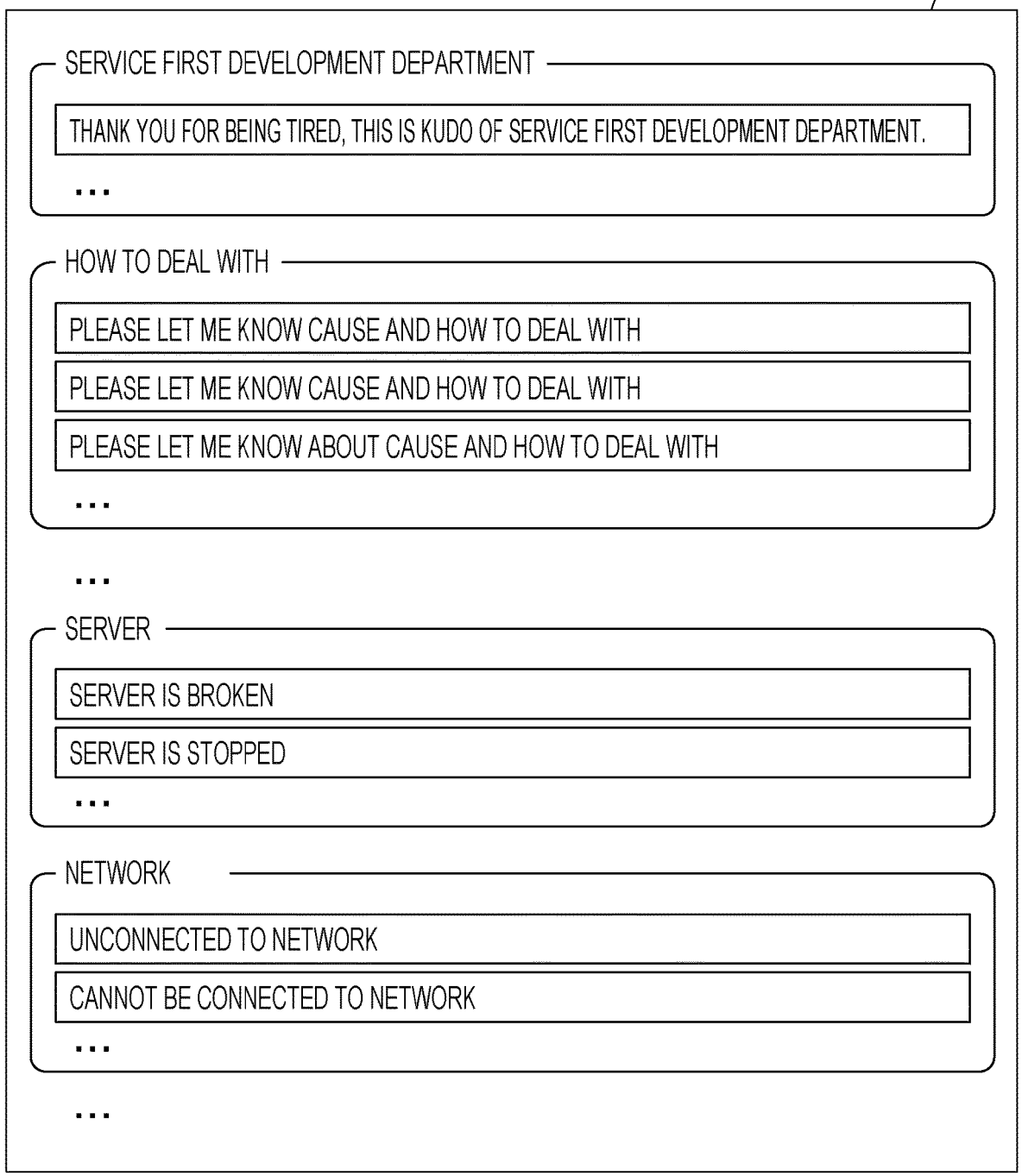
FIG. 10 is a diagram illustrating an example of a classification result screen.

An example of a classification result screen 30 displayed on the display device is illustrated in FIG. 10. In the example illustrated in FIG. 10, each of clusters is surrounded by one frame. A simple sentence included in the cluster is displayed in the frame. In each of the clusters, a feature word associated with the cluster is displayed in association with the cluster by the classifying unit 16. In FIG. 10, an example is illustrated in which a cluster into which a fixed form expression is classified is displayed above clusters into which simple sentences indicating specific contents concerning incidents such as a server and a network are classified.

The classification result screen 30 is not limited to the example illustrated in FIG. 10. For example, a display form may be adopted in which only feature words associated with the clusters are displayed on the display device in sorting order and the feature words are selected from the screen to display simple sentences included in the clusters represented by the feature words.

Figure 11:
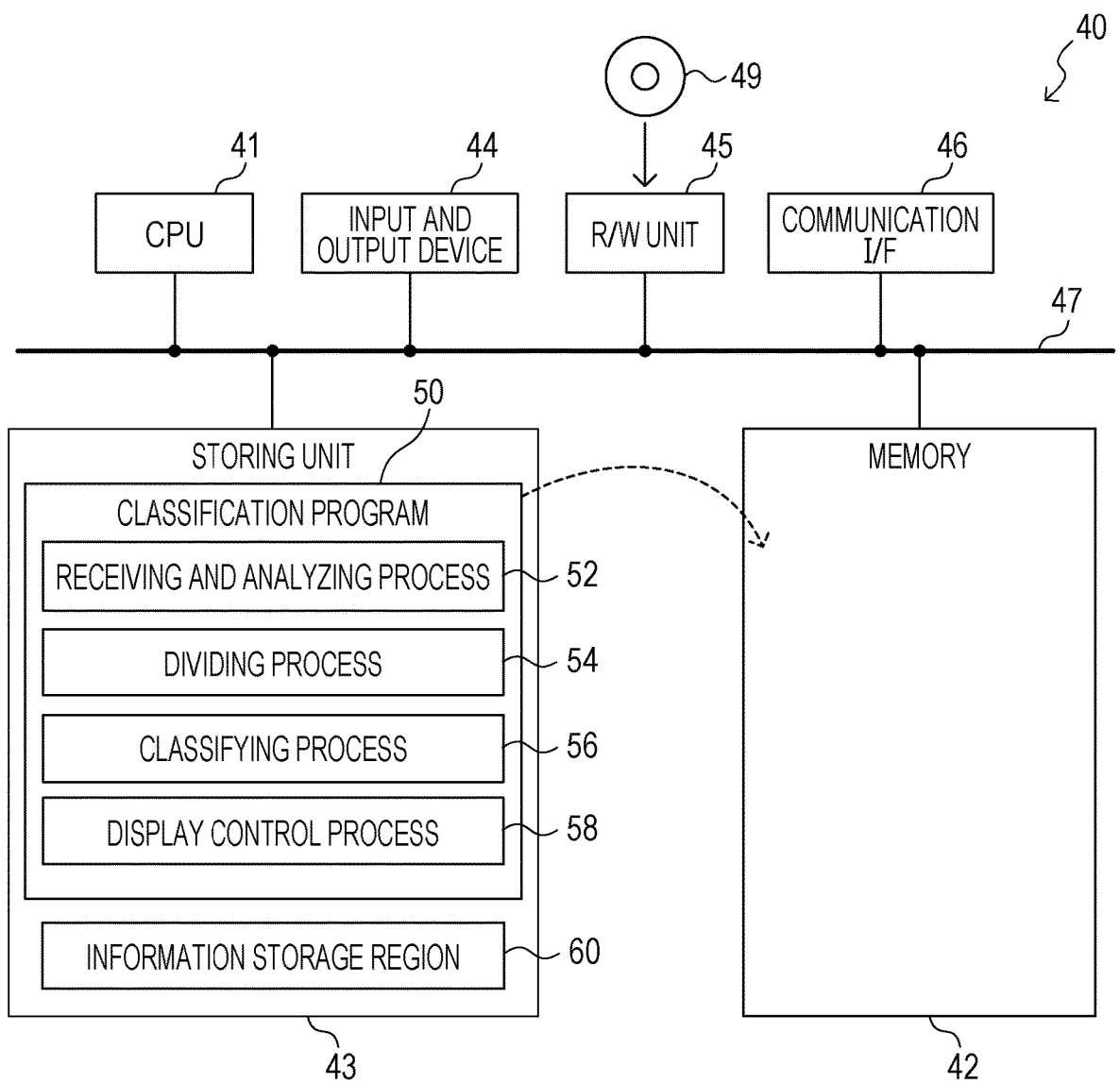
FIG. 11 is a block diagram illustrating a schematic configuration of a computer functioning as a classification device according to the embodiment.

The classification device 10 may be realized by, for example, a computer 40 illustrated in FIG. 11. The computer 40 includes a central processing unit (CPU) 41, a memory 42 functioning as a temporary storage region, and a nonvolatile storing unit 43. The computer 40 includes an input and output device 44 such as an input device and a display device and a read/write (R/W) unit 45 that controls reading and writing of data from and in a storage medium 49. The computer 40 includes a communication I/F 46 connected to a network such as the Internet. The CPU 41, the memory 42, the storing unit 43, the input and output device 44, the R/W unit 45, and the communication I/F 46 are connected to one another via a bus 47.

The storing unit 43 may be realized by a hard disk drive (HDD), a solid state drive (SSD), a flash memory, or the like. A classification program 50 for causing the computer 40 to function as the classification device 10 is stored in the storing unit 43 functioning as a storage medium. The classification program 50 includes a receiving and analyzing process 52, a dividing process 54, a classifying process 56, and a display control process 58. The storing unit 43 includes an information storage region 60 where information forming the word model 24 is stored.

The CPU 41 reads out the classification program 50 from the storing unit 43 and develops the classification program 50 in the memory 42 and sequentially executes the processes of the classification program 50. The CPU 41 executes the receiving and analyzing process 52 to operate as the receiving and analyzing unit 12 illustrated in FIG. 6. The CPU 41 executes the dividing process 54 to operate as the dividing unit 14 illustrated in FIG. 6. The CPU 41 executes the classifying process 56 to operate as the classifying unit 16 illustrated in FIG. 6. The CPU 41 executes the display control process 58 to operate as the display control unit 18 illustrated in FIG. 6. The CPU 41 reads out information from the information storage region 60 and develops the word model 24 in the memory 42. Consequently, the computer program 40 executing the classification program 50 functions as the classification device 10. The CPU 41 that executes the programs is hardware.

The functions realized by the classification program 50 may also be realized by, for example, a semiconductor integrated circuit, more specifically, an application specific integrated circuit (ASIC) or the like.

Action of the classification device 10 according to this embodiment is explained.

For example, a text set in which a set of documents in one incident including documents such as mail during incident handling concerning the system is set as one document and the documents included in the document set are shaped into a text of one sentence is input to the classification device 10. The classification device 10 executes classification processing illustrated in FIG. 12. The classification processing is an example of a classification method of the disclosed technique.

Figure 12:
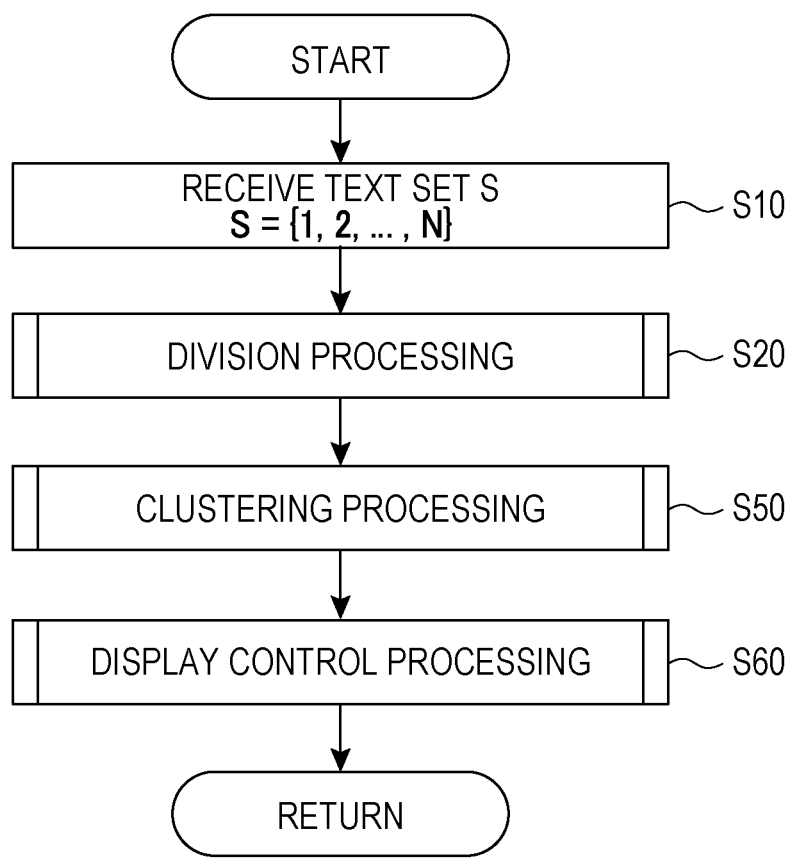
FIG. 12 is a flowchart illustrating an example of classification processing in the embodiment.

In step S10 of the classification processing illustrated in FIG. 12, the receiving and analyzing unit 12 receives a text set S input to the classification device 10. The text set S includes a text 1, a text 2, . . . , and a text N (N is the number of texts included in the text set S).

Figure 13:
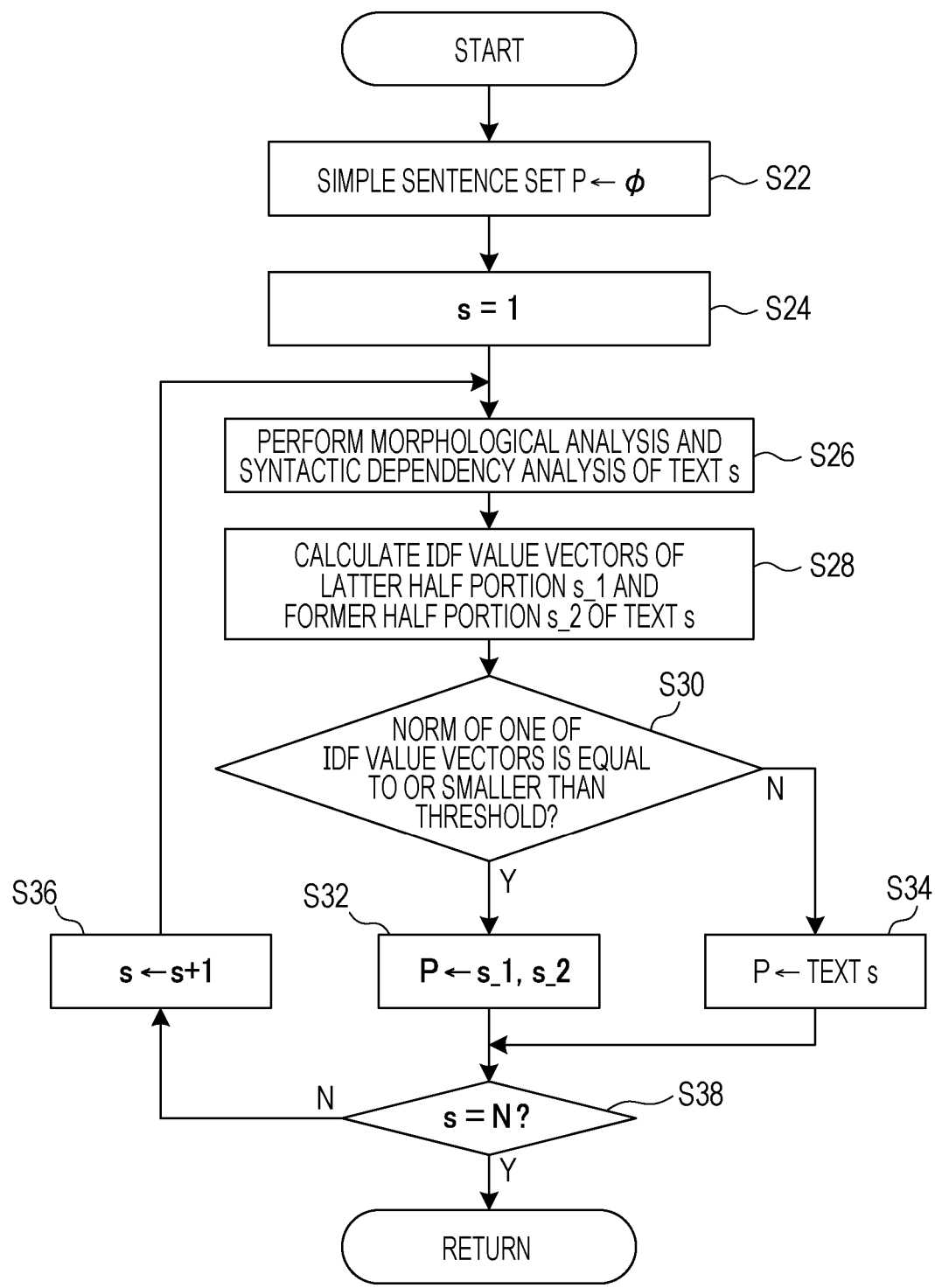
FIG. 13 is a flowchart illustrating an example of division processing.

In step S20, division processing illustrated in FIG. 13 is executed.

In step S22 of the division processing illustrated in FIG. 13, an empty set is prepared as a simple sentence set P. In step S24, 1 is set in a variable s for identifying a text.

In step S26, the receiving and analyzing unit 12 performs a morphological analysis on the text s, divides the text s into morphemes, and gives attribute information to the morphemes. The receiving and analyzing unit 12 performs a syntactic dependency analysis on the text s using a result of the morphological analysis and analyzes a syntactic dependency relation for each of clauses.

In step S28, the dividing unit 14 separates, based on the analysis result in step S26, the text s into a latter half portion s_1 and a former half portion s_2 in a predetermined pause part such as ", (a comma)". The dividing unit 14 acquires IDF values of words included in the text s referring to the IDF value table 24A included in the word model 24. The dividing unit 14 calculates norms of vectors of IDF values respectively concerning the latter half portion s_1 and the former half portion s_2 using the IDF values for each of the words acquired from the IDF value table 24A.

In step S30, the dividing unit 14 determines whether one of a norm v_1 of the IDF value of the latter half portion s_1 and a norm v_2 of the IDF value of the former half portion s_2 is equal to or smaller than a predetermined threshold TH. When one of v_1 and v_2 is equal to or smaller than the threshold TH, the processing shifts to step S32. When both of v_1 and v_2 are equal to or smaller than the threshold TH or both of v_1 and v_2 are larger than the threshold TH, the processing shifts to step S34.

In step S32, the dividing unit 14 divides the text s into simple sentences s_1 and s_2 and adds the simple sentences s_1 and s_2 to the simple sentence set P. On the other hand, in step S34, the dividing unit 14 directly adds the text s to the simple sentence set P.

In step S38, the receiving and analyzing unit 12 determines whether s is N to thereby determine, concerning all the texts included in the received text set S, whether the processing in steps S26 to S32 or step S34 has ended. When s has not reached N, the processing shifts to step S36. The receiving and analyzing unit 12 increments s by 1. The processing returns to step S26. When s=N, the division processing ends. The processing returns to the classification processing.

Figure 14:
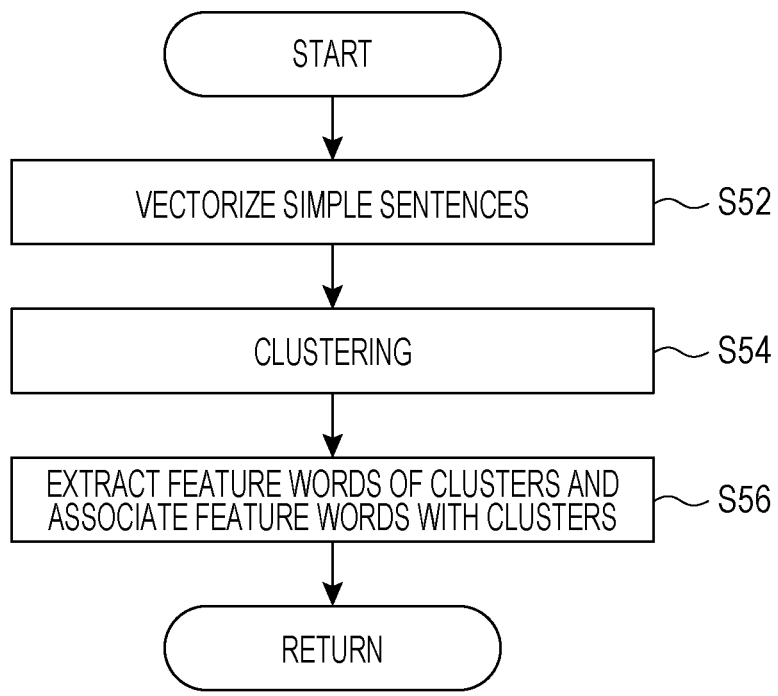
FIG. 14 is a flowchart illustrating an example of clustering processing.

Subsequently, in step S50 of the classification processing illustrated in FIG. 12, clustering processing illustrated in FIG. 14 is executed.

In step S52 of the clustering processing illustrated in FIG. 14, the classifying unit 16 vectorizes the simple sentences included in the simple sentence set P using the word vector table 24B of the word model 24.

In step S54, the classifying unit 16 clusters the simple sentences according to the known clustering method such as k-means or simple linkage using, for example, cosine similarity degrees of word vectors of the simple sentences.

In step S56, the classifying unit 16 extracts, based on indicators indicating appearance states such as TF-IDF of words included in the simple sentences classified into a respective plurality of clusters, feature value from the respective plurality of clusters and associates the extracted feature words with the clusters. The clustering processing ends. The processing returns to the classification processing.

Figure 15:
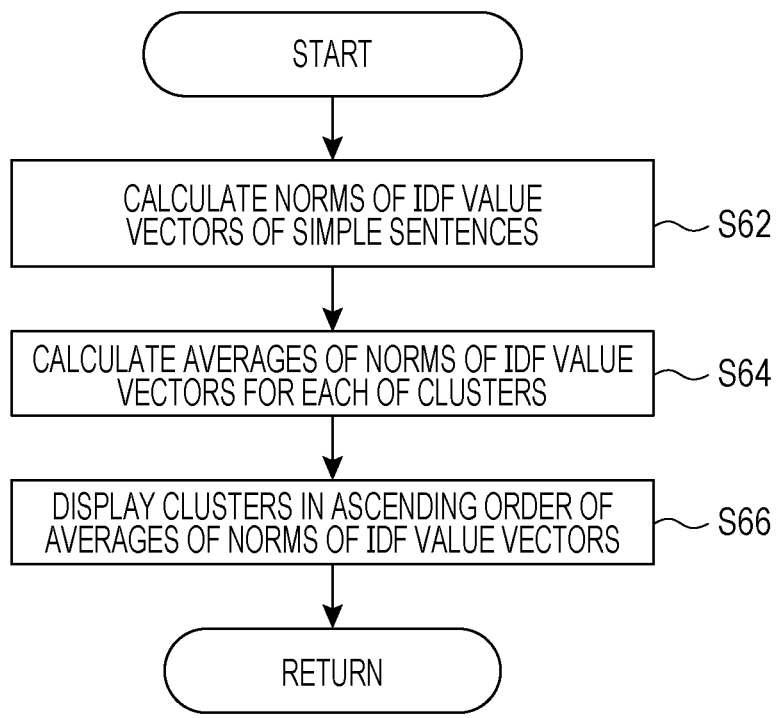
FIG. 15 is a flowchart illustrating an example of display control processing.

In step S60 of the classification processing illustrated in FIG. 12, display control processing illustrated in FIG. 15 is executed.

In step S62 of the display control processing illustrated in FIG. 15, the display control unit 18 acquires IDF values of the words included in the simple sentences referring to the IDF value table 24A included in the word model 24 and calculates norms of IDF value vectors of the simple sentences.

In step S64, the display control unit 18 calculates, for each of the clusters, an average of the norms of the IDF value vectors of the respective simple sentences included in the cluster.

In step S66, the display control unit 18 sorts the clusters in ascending order of averages of the norms of the IDF value vectors and displays, for example, the classification result screen 30 illustrated in FIG. 10 on the display device. The display control processing ends and the classification processing ends.

As explained above, the classification device according to this embodiment divides the texts included in the text set in the specific pause part and then clusters and classifies the texts based on, for example, the cosine similarity degrees of the word vectors. Consequently, even when a text is a complex sentence and includes a fixed form expression in a part of the text, it is possible to improve classification accuracy of the texts for extracting the fixed form expression.

When the norm of the IDF value vector of one of the former half portion and the latter half portion obtained by separating the text in the pause part such as the comma is equal to or smaller than the predetermined threshold, the classification device sets the pause part as a specific pause part. Consequently, it is possible to further improve the classification accuracy of the text for extracting the fixed form expression.

In the explanation in the embodiment, the clusters are sorted in the ascending order of the averages of the norms of the IDF value vectors of the respective simple sentences included in the clusters. However, the sorting of the clusters is not limited to this. For example, the clusters may be sorted in descending order of the numbers of simple sentences classified into the clusters. It is assumed that an appearance frequency of the fixed form expression in the text set is high.

Therefore, the cluster including a large number of simple sentences is regarded as the cluster into which the fixed form expression is classified.

In the explanation in the embodiment, the pause part of the text is specified based on the morphological analysis result and the syntactic dependency analysis result of the text. However, the pause part is not limited to this. For example, a pause part specifiable based on the morphological analysis result and the syntactic dependency analysis result may be used, for example, the pause part may be set before or after a predetermined character string. In this case, the processing of the morphological analysis and the syntactic dependency analysis in the receiving and analyzing unit may be omitted. The processing of the morphological analysis and the syntactic dependency analysis in the receiving and analyzing unit may be omitted by receiving an analyzed text set.

In the explanation in the embodiment, the text set obtained by shaping the document concerning incident handling of the system is input. However, the disclosed technique is not limited to this. The disclosed technique is applicable to various documents. In particular, the disclosed technique is effective for a document including a large number of fixed form expressions.

In the explanation in the embodiment, the classification program is stored (installed) in the storing unit in advance. However, a program according to the disclosed technique is not limited to this. The program according to the disclosed technique may also be provided in a form in which the program is stored in a storage medium such as a CD-ROM, a DVD-ROM, or a USB memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A text classification method performed in a computer, the method comprising:
   receiving a plurality of texts;
   when detecting that a text among the received plurality of texts includes a pause part satisfying a specific condition, dividing the text at the pause part and generating a new plurality of texts; and
   classifying texts, among the received plurality of texts not including the pause part satisfying the specific condition and the generated new plurality of texts, into a plurality of clusters,
   when an appearance state in the plurality of texts of one of a former half portion and a latter half portion obtained by dividing the text at a pause part satisfies a predetermined condition, the pause part is set as the pause part satisfying the specific condition.

2. The text classification method according to claim 1, further comprising:
   generating, based on the texts classified into respective plurality of clusters, feature information of the respective plurality of clusters; and
   displaying the generated feature information on a display in association with the respective plurality of clusters.

3. The text classification method according to claim 2, further comprising:
   determining, for the plurality of clusters, based on the texts classified into the respective plurality of clusters and appearance states in the received plurality of texts of a plurality of morphemes included in the texts classified into the respective plurality of clusters, a plurality of representative morphemes respectively representing the plurality of clusters; and
   displaying the determined plurality of representative morphemes on the display unit in association with the respective plurality of clusters represented by
   respective plurality of representative morphemes.

4. The text classification method according to claim 3, further comprising:
   arranging the respective determined plurality of representative morphemes in order corresponding to numbers of the texts classified into the respective plurality of clusters and displaying the plurality of representative morphemes on the display.

5. The text classification method according to claim 2, further comprising:
   arranging, based on indicators concerning appearance states of the texts in the plurality of texts, the clusters in descending order of appearance frequencies indicated by the indicators concerning the texts included in the respective plurality of clusters and displaying the respective plurality of clusters on the display.

6. The text classification method according to claim 1, wherein the pause part satisfying the specific condition is a comma.

7. A text classification device comprising:
   a memory, and
   a processor coupled to the memory and configured to:
     receive a plurality of texts;
     divide, when detecting that a text among the received plurality of texts includes a pause part satisfying a specific condition, the text at the pause part and generating a new plurality of texts; and
     classify texts, among the received plurality of texts not including the pause part satisfying the specific condition and the generated new plurality of texts, into a plurality of clusters,
     when an appearance state in the plurality of texts of one of a former half portion and a latter half portion obtained by dividing the text at a pause part satisfies a predetermined condition, the pause part is set as the pause part satisfying the specific condition.

8. The text classification device according to claim 7, the processor is further configured to:
   generate, based on the texts classified into respective plurality of clusters, feature information of the respective plurality of clusters; and
   display the generated feature information on a display in association with the respective plurality of clusters.

9. The text classification device according to claim 8, the processor is further configured to:
   determine, for the plurality of clusters, based on the texts classified into the respective plurality of clusters and appearance states in the received plurality of texts of a plurality of morphemes included in the texts classified into the respective plurality of clusters, a plurality of representative morphemes respectively representing the plurality of clusters; and
   display the determined plurality of representative morphemes on the display unit in association with the respective plurality of clusters represented by the respective plurality of representative morphemes.

10. The text classification device according to claim 9, the processor is further configured to:
arrange the respective determined plurality of representative morphemes in order corresponding to numbers of the texts classified into the respective plurality of clusters, and display the plurality of representative morphemes on the display.

11. The text classification device according to claim 8, the processor is further configured to:
arrange, based on indicators concerning appearance states of the texts in the plurality of texts, the clusters in descending order of appearance frequencies indicated by the indicators concerning the texts included in the respective plurality of clusters and display the respective plurality of clusters on the display.

12. The text classification device according to claim 7, wherein the pause part satisfying the specific condition is a comma.

13. A non-transitory computer-readable storage medium storing a text classification program that causes a computer to perform a process comprising:
receiving a plurality of texts;
dividing, when detecting that a text among the received plurality of texts includes a pause part satisfying a specific condition, the text at the pause part and generating a new plurality of texts; and
classifying texts, among the received plurality of texts not including the pause part satisfying the specific condition and the generated new plurality of texts, into a plurality of clusters,
when an appearance state in the plurality of texts of one of a former half portion and a latter half portion obtained by dividing the text at a pause part satisfies a predetermined condition, the pause part is set as the pause part satisfying the specific condition.

14. The storage medium according to claim 13, the process further comprising:
generating, based on the texts classified into respective plurality of clusters, feature information of the respective plurality of clusters; and
displaying the generated feature information on a display unit in association with the respective plurality of clusters.

15. The storage medium according to claim 14, the process further comprising:
determining, for the plurality of clusters, based on the texts classified into the respective plurality of clusters and appearance states in the received plurality of texts of a plurality of morphemes included in the texts classified into the respective plurality of clusters, a plurality of representative morphemes respectively representing the plurality of clusters; and
displaying the determined plurality of representative morphemes on the display unit in association with the respective plurality of clusters represented by the respective plurality of representative morphemes.

16. The storage medium according to claim 15, the process further comprising:
arranging the respective determined plurality of representative morphemes in order corresponding to numbers of the texts classified into the respective plurality of clusters and displaying the plurality of representative morphemes on the display.

17. The storage medium according to claim 14, the process further comprising:
arranging, based on indicators concerning appearance states of the texts in the plurality of texts, the clusters in descending order of appearance frequencies indicated by the indicators concerning the texts included in the respective plurality of clusters and displaying the respective plurality of clusters on the display.

18. The storage medium according to claim 13, wherein the pause part satisfying the specific condition is a comma.

* * * * *